(12) United States Patent
Speece

(10) Patent No.: US 6,848,258 B1
(45) Date of Patent: Feb. 1, 2005

(54) GAS TRANSFER ENERGY RECOVERY AND EFFERVESCENCE PREVENTION APPARATUS AND METHOD

(75) Inventor: Richard E. Speece, Nashville, TN (US)

(73) Assignee: Eco-Oxygen Technologies, LLC, Indianapolis, IN (US)

( * ) Notice: Subject to any disclaimer, the term of this patent is extended or adjusted under 35 U.S.C. 154(b) by 0 days.

(21) Appl. No.: 10/673,927

(22) Filed: Sep. 29, 2003

Related U.S. Application Data

(63) Continuation-in-part of application No. 10/125,161, filed on Apr. 18, 2002, now Pat. No. 6,668,556.

(51) Int. Cl.⁷ .............................. B01F 1/00; B01F 3/04; B01F 15/02; F01D 5/14; F01K 25/02
(52) U.S. Cl. .............................. 60/649; 60/651; 60/671
(58) Field of Search .......................... 60/649, 651, 671

(56) References Cited

U.S. PATENT DOCUMENTS

| | | |
|---|---|---|
| 1,863,111 A | 6/1932 | Greve |
| 3,201,919 A | 8/1965 | Long |
| 3,614,256 A | 10/1971 | Sieghartner |
| 3,617,537 A | 11/1971 | Vermette |
| 3,643,403 A | 2/1972 | Speece |
| 3,677,936 A | 7/1972 | Bastiannse |
| 3,737,382 A | 6/1973 | Fletcher et al. |
| 3,738,620 A | 6/1973 | Ennis |
| 3,756,197 A | 9/1973 | Buss et al. |
| 3,758,083 A | 9/1973 | Palmer |
| 3,772,187 A | 11/1973 | Othmer |
| 3,778,233 A | 12/1973 | Blough et al |
| 3,779,913 A | 12/1973 | Martin |
| 3,804,255 A | 4/1974 | Speece |
| 3,815,879 A | 6/1974 | Mikhailov et al. |
| 3,840,457 A | 10/1974 | Wilson |
| 3,926,588 A | 12/1975 | Speece |
| 3,927,152 A | 12/1975 | Kyrias |
| 3,947,359 A | 3/1976 | Laurie |
| 3,953,554 A | 4/1976 | Loughridge |
| 3,956,124 A | 5/1976 | Fast et al. |
| 3,981,273 A | 9/1976 | Buss |
| 3,984,323 A | 10/1976 | Evens |
| 3,992,491 A | 11/1976 | Ihrig et al. |
| 4,044,720 A | 8/1977 | Fast |
| 4,048,072 A | 9/1977 | McCullough |
| 4,064,750 A | 12/1977 | Speece |

(List continued on next page.)

FOREIGN PATENT DOCUMENTS

| | | |
|---|---|---|
| GB | 1455567 | 1/1973 |
| SU | 1639707 | 7/1991 |
| WO | WO 79/00350 | 6/1979 |

*Primary Examiner*—Sheldon J Richter
(74) *Attorney, Agent, or Firm*—Rachel L. St. Peter; Doreen J. Gridley

(57) ABSTRACT

A gas transfer system and method for dissolving at least one gas into a liquid. The system includes a gas transfer vessel also known as a reactor. A liquid inlet feed is connected to the reactor for transferring the liquid into the reactor. A gas inlet is connected to the reactor for feeding the gas into the reactor. An outlet is connected to the reactor for transferring the liquid with at least some of the gas therein away from the reactor. The system also includes a feed pump connected to the inlet feed to pressurize the contents of the inlet feed and the reactor, and a regenerative turbine connected to the feed pump and to the outlet. The various embodiments of the gas transfer system use pressurization in the gas transfer vessel to enhance gas transfer therein, minimize the net energy consumption, and retain highly supersaturated dissolved gas in solution. Some embodiments further help to reduce effervescence loss. The method of the present invention utilizes the system of the present invention and operates the feed pump and regenerative turbine to accomplish these advantages.

18 Claims, 10 Drawing Sheets

U.S. PATENT DOCUMENTS

| | | |
|---|---|---|
| 4,087,262 A | 5/1978 | Speece |
| 4,094,774 A | 6/1978 | Smith |
| 4,102,650 A | 7/1978 | Spevack |
| 4,126,544 A | 11/1978 | Baensch et al. |
| 4,133,850 A | 1/1979 | Hauser |
| 4,146,478 A | 3/1979 | Rongved |
| 4,157,304 A | 6/1979 | Molvar |
| 4,171,263 A | 10/1979 | Roberts, Jr. et al. |
| 4,179,375 A | 12/1979 | Smith |
| 4,203,841 A | 5/1980 | Shimizu et al. |
| 4,210,534 A | 7/1980 | Molvar |
| 4,213,923 A | 7/1980 | Bryson |
| 4,224,158 A | 9/1980 | Molvar |
| 4,226,717 A | 10/1980 | Malm |
| 4,226,719 A | 10/1980 | Woltman |
| 4,235,719 A | 11/1980 | Pearson |
| 4,244,821 A | 1/1981 | Molvar |
| 4,248,707 A | 2/1981 | Granger |
| 4,251,365 A | 2/1981 | Speece |
| 4,344,774 A | 8/1982 | Skipper |
| 4,347,143 A | 8/1982 | Righetti |
| 4,350,589 A | 9/1982 | Stog |
| 4,368,121 A | 1/1983 | Vasiliev et al. |
| 4,415,508 A | 11/1983 | Aida et al. |
| 4,418,540 A | 12/1983 | Kasparian et al. |
| 4,421,648 A | 12/1983 | Besik |
| 4,451,213 A | 5/1984 | Takei et al. |
| 4,474,713 A | 10/1984 | Wickoren |
| 4,504,388 A | 3/1985 | Desbos et al. |
| 4,508,492 A | 4/1985 | Kusakawa et al. |
| 4,545,945 A | 10/1985 | Prave et al. |
| 4,581,137 A | 4/1986 | Edwards et al. |
| 4,587,064 A | 5/1986 | Blum |
| 4,650,404 A | 3/1987 | Kusakawa |
| 4,659,485 A | 4/1987 | Arbisi et al. |
| 4,690,756 A | 9/1987 | Van Ry |
| 4,695,378 A | 9/1987 | Ackman et al. |
| 4,704,204 A | 11/1987 | Kaelin |
| 4,724,086 A | 2/1988 | Kortmann |
| 4,724,677 A | 2/1988 | Foster |
| 4,732,682 A | 3/1988 | Rymal |
| 4,749,493 A | 6/1988 | Hicks |
| 4,749,527 A | 6/1988 | Rasmusen |
| 4,786,419 A | 11/1988 | Mouratoglu et al. |
| 4,790,355 A | 12/1988 | Kennedy |
| 4,793,919 A | 12/1988 | McCorquodale |
| 4,820,412 A | 4/1989 | Meyer-Rudolphi et al. |
| 4,857,350 A | 8/1989 | Iwasaki et al. |
| 4,863,643 A | 9/1989 | Cochran |
| 4,863,644 A | 9/1989 | Harrington et al. |
| 4,867,918 A | 9/1989 | Kiyonaga et al. |
| 4,885,084 A | 12/1989 | Doyle |
| 4,906,359 A | 3/1990 | Cox, Jr. |
| 4,911,838 A | 3/1990 | Tanaka |
| 4,911,849 A | 3/1990 | Labesque et al. |
| 4,930,993 A | 6/1990 | Han |
| 4,931,225 A | 6/1990 | Cheng |
| 4,956,080 A | 9/1990 | Josefik |
| 4,961,400 A | 10/1990 | Lapray |
| 5,011,369 A | 4/1991 | Mine et al. |
| 5,013,429 A | 5/1991 | Krofta |
| 5,045,202 A | 9/1991 | Stearns et al. |
| 5,057,230 A | 10/1991 | Race |
| 5,080,802 A | 1/1992 | Cairo, Jr. et al. |
| 5,084,167 A | 1/1992 | Beard et al. |
| 5,087,377 A | 2/1992 | Josefik |
| 5,096,386 A | 3/1992 | Kassel |
| 5,110,741 A | 5/1992 | Ohi et al. |
| 5,116,501 A | 5/1992 | House |
| 5,116,506 A | 5/1992 | Williamson et al. |
| 5,118,415 A | 6/1992 | Weis et al. |
| 5,133,876 A | 7/1992 | Tharp |
| 5,152,888 A | 10/1992 | Koyama |
| 5,160,459 A | 11/1992 | Guarnaschelli et al. |
| 5,167,806 A | 12/1992 | Wang et al. |
| 5,167,878 A | 12/1992 | Arbisi et al. |
| 5,185,085 A | 2/1993 | Borgren |
| 5,194,144 A | 3/1993 | Blough |
| 5,200,080 A | 4/1993 | Bergman, Jr. et al. |
| 5,211,916 A | 5/1993 | Cheng |
| 5,238,253 A | 8/1993 | Sieghartner |
| 5,252,229 A | 10/1993 | Rojey et al. |
| 5,256,282 A | 10/1993 | Chang et al. |
| 5,262,051 A | 11/1993 | Iwatsuka |
| 5,264,130 A | 11/1993 | Etlin |
| 5,294,340 A | 3/1994 | Stog |
| 5,302,286 A | 4/1994 | Semprini et al. |
| 5,314,621 A | 5/1994 | Rogalla |
| 5,330,639 A | 7/1994 | Murphree |
| 5,352,369 A | 10/1994 | Heinig, Jr. |
| 5,356,600 A | 10/1994 | Kiyonaga et al. |
| 5,362,400 A | 11/1994 | Martinell |
| 5,380,471 A | 1/1995 | Ban et al. |
| 5,391,328 A | 2/1995 | Ott et al. |
| 5,403,522 A | 4/1995 | Von Berg |
| 5,423,979 A | 6/1995 | Allen |
| 5,437,784 A | 8/1995 | Meinecke et al. |
| 5,463,176 A | 10/1995 | Eckert |
| 5,463,879 A | 11/1995 | Jones |
| 5,494,583 A | 2/1996 | Dieter |
| 5,494,589 A | 2/1996 | Moorehead et al. |
| 5,496,505 A | 3/1996 | Walla et al. |
| 5,520,818 A | 5/1996 | Smith et al. |
| 5,525,242 A | 6/1996 | Kerecz |
| 5,543,089 A | 8/1996 | Pichardo |
| 5,569,416 A | 10/1996 | Cross |
| 5,580,463 A | 12/1996 | Hubred |
| 5,590,551 A | 1/1997 | Hong |
| 5,591,001 A | 1/1997 | Ray et al. |
| 5,595,691 A | 1/1997 | Hsu |
| 5,624,565 A | 4/1997 | Lefevre et al. |
| 5,639,371 A | 6/1997 | Loy et al. |
| 5,741,443 A | 4/1998 | Gemza |
| 5,755,091 A | 5/1998 | Johnson |
| 5,772,886 A | 6/1998 | Bettle |
| 5,783,118 A | 7/1998 | Kolaini |
| 5,784,885 A | 7/1998 | Ishihama et al. |
| 5,785,854 A | 7/1998 | McKinney |
| 5,814,222 A | 9/1998 | Zelenak et al. |
| 5,819,524 A | 10/1998 | Bosley et al. |
| 5,863,031 A | 1/1999 | Veeder et al. |
| 5,874,001 A | 2/1999 | Carter |
| 5,876,639 A | 3/1999 | Campau |
| 5,885,466 A | 3/1999 | Kelly |
| 5,904,851 A | 5/1999 | Taylor et al. |
| 5,935,490 A | 8/1999 | Archbold et al. |
| 5,948,326 A | 9/1999 | Pate |
| 5,951,922 A | 9/1999 | Mazzei |
| 5,968,352 A | 10/1999 | Ditzler |
| 5,988,601 A | 11/1999 | Burgess |
| 6,017,020 A | 1/2000 | Baughman et al. |
| 6,032,931 A | 3/2000 | Plunkett |
| 6,033,576 A | 3/2000 | Russo |
| 6,036,749 A | 3/2000 | Ribeiro et al. |
| 6,050,550 A | 4/2000 | Burgess |
| 6,059,537 A | 5/2000 | Cygnor |
| 6,066,193 A | 5/2000 | Lee |
| 6,113,675 A | 9/2000 | Branstetter |
| 6,161,467 A | 12/2000 | A'Hearn et al. |
| 6,223,540 B1 | 5/2001 | Egermeier |
| 6,280,157 B1 | 8/2001 | Cooper |

| | | | | | |
|---|---|---|---|---|---|
| 6,322,055 B1 | 11/2001 | Speece | 2001/0018026 A1 | 8/2001 | Lampe et al. |
| 6,474,627 B2 | 11/2002 | Speece | 2002/0066970 A1 | 6/2002 | Speece |
| 6,485,003 B2 | 11/2002 | Speece | | | |
| 6,668,556 B2 * | 12/2003 | Speece ........................ 60/649 | * cited by examiner | | |

GAS TRANSFER ENERGY RECOVERY AND EFFERVESCENCE PREVENTION APPARATUS AND METHOD

RELATED PATENT APPLICATION

This is a continuation-in-part of U.S. patent application Ser. No. 10/125,161 filed Apr. 18, 2002 now U.S. Pat. No. 6,668,556.

BACKGROUND OF THE INVENTION

There are many instances when it is desirable to dissolve a gas, whether soluble or insoluble, into a fluid that may already contain other dissolved gases. For example, the macro and microbial organisms in all rivers, lakes, oceans, and all aerobic wastewater treatment processes are based on the presence of sufficient dissolved oxygen to sustain their life processes. Normally, in undisturbed bodies of water there is a rather low density of macro and micro organisms in the surface water and the limited natural absorption of oxygen from the air into the water is sufficient to maintain sufficient concentrations of dissolved oxygen in the water to sustain the life processes of that body of water. However, with increased population density and industrial activity, the associated organic water pollution causes a high microbial oxygen demand that natural oxygen aeration processes cannot begin to provide sufficient oxygen resources. Thus, artificial aeration mechanisms are required to enhance oxygen absorption.

Some specific examples of oxygenation applications are worthy of discussion. Odors at aerobic wastewater treatment facilities are associated with the inability to maintain sufficient levels of dissolved oxygen ("D.O."). In the absence of sufficient D.O., nitrates are reduced to $N_2$ gas. In the absence of both D.O. and nitrates, strongly reducing conditions develop and sulfates are reduced to $H_2S$, also known as "rotten egg gas". This process can occur in any aquatic system where the oxygen demand exceeds the D.O. supply.

The high organic pollution in municipal wastewater of sewer lift stations supports a corresponding high microbial population, which, in turn, requires a high rate of D.O. to meet the demand. If the demand is not met, $H_2S$ formation readily occurs. Consequently, sewer force mains are a common source of odor nuisance for municipal public works.

Some industries (pharmaceutical, petroleum, and chemical, for example) create significant air pollution problems in the course of aerobically treating their wastewater by the use of conventional aeration systems. The wastewaters contain significant volatile organics/solvents that are readily biodegradable if they can be retained in the aqueous phase for a sufficient time. The use of conventional aeration systems has led to the requirement that the wastewater aeration basins must be covered to capture and incinerate the off gas in order to comply with air emission regulations. The need for a covered basin arises because conventional aeration systems readily strip the organics/solvents from the aqueous phase, not allowing for a sufficient time to biograde in the liquid.

Aerobic activated sludge processes are dependent upon oxygen transfer and sludge settling and recycle in the secondary clarifiers. It is now possible to develop high concentrations of sludge concentrations within the reactors, such as with the use of aerobic fluidized beds and moving bed filters, to the point where oxygen transfer becomes the limiting factor. Specifically, high levels of D.O. are required without subjecting the sludge to high energy dissipation/turbulence conditions that could shear off the biofilms or hinder flocculent sedimentation in the secondary clarifiers.

Fish farming and shrimp production commonly occurs in large ponds. To maximize production, the ponds are operated at the edge of D.O. availability. Since a still pond absorbs very little oxygen, there exists a need for artificial aeration to sustain high levels of fish/shellfish production.

The desire to increase dissolved oxygen levels is also applicable to slow moving rivers (such as the Cuyahoga River flowing through Cleveland, Ohio, and the rivers in Bangkok and Taipei) and canals (such as the waterways of Chicago, Ill. and the canals of Amsterdam). Many industries must curtail production (to considerable economic detriment) due to insufficient D.O. in the rivers, streams, and canals to which they discharge their treated wastewaters. Odor and corrosion problems can also occur in the bottom layer of stratified lakes and reservoirs feeding hydroelectric power dams. The low D.O. levels also result in fish kills.

Systems for dissolving a gas into a fluid are not limited to dissolving oxygen in water. Other gas/fluid combinations include: hydrogenation of vegetable oils, coal liquification, yeast production, Vitamin C production, pharmaceutical and industrial aerobic bioprocesses, and other processes well known in the art.

When high purity oxygen is being transferred into water, issues arise as to handling of dissolved nitrogen ("D.N.") already in the water. D.N. is not utilized in an aqueous environment. Air is primarily comprised of 21% oxygen and 79% nitrogen gas. When water is in contact with air for prolonged periods, the water is saturated with D.N. At 20° C., the saturation concentration of D.N. in water is 16 mg/L. With conventional aeration systems, D.N. levels remain in a steady state. However, when high purity oxygen is introduced into the water, it results in a reduced D.N. partial pressure that strips the D.N. from the dissolved phase into the gas phase where it, in turn, reduces the percentage oxygen composition. The reduction in percentage oxygen composition reduces the partial pressure of oxygen in the gas phase, and the saturation concentration of oxygen, and ultimately the rate of oxygen transfer.

Thus, the presence of D.N. in the incoming water presents a trade-off situation. If high oxygen absorption efficiency is to be achieved, the increased nitrogen gas composition in the gas phase has to be accepted. This reduces the D.O. concentration which can be achieved in the discharge. Conversely, if high D.O. levels are to be achieved in the discharge, then the stripped nitrogen in the gas phase has to be wasted to reduce its percentage composition carrying with it a commensurate ratio of oxygen gas and reducing the percentage oxygen absorption efficiency.

It is well known that pressure greatly enhances the dissolving of a gas into a liquid, including, but not limited to, dissolving high purity oxygen (HPO) into water. However, in conventional pressurization schemes, considerable energy expenditure is involved. To dissolve HPO into water, the rate of gas transfer is related to partial pressure of the gas to be transferred, $C_{sat}$, which is dependent upon the pressure of the gas to be transferred. The partial pressure of the gas to be transferred may be computed by multiplying the total pressure times the composition of the gas in the gas phase:

$C_{sat}$=(45 mg/L-atmosphere)(composition of gas phase)(pressure of the gas phase)

For the case of dissolving oxygen into water:

$C_{sat}$=(45 mg/L-atmosphere)(Oxygen partial pressure in atmosphere)

For air at one atmosphere of pressure, the oxygen fraction is 0.21 and thus the total oxygen partial pressure is 0.21 atmosphere. Thus, at one atmosphere of pressure, $C_{sat}$=(45×0.21=9.2 mg/L.

For 100% oxygen at 15 psig, the partial pressure is 2.0 atmospheres absolute and $C_{sat}$ is 90 mg/L. Thus, increases in purity and pressure of the gas to be dissolved significantly increases $C_{sat}$.

The rate of gas transfer, dc/dt, is related to a number of factors as shown in the gas transfer equation:

$$dc/dt = K_1(A/V)(C_{sat} - C_{act})$$

where $K_1$ is the gas transfer coefficient

A is the interfacial area of gas exposed to the water

V is the volume of water $C_{sat}$ is the saturation concentration as defined above $C_{act}$ is the actual concentration of dissolved gas in the water Since the liquid into which the high purity gas is to be transferred often contains other dissolved gases, these extraneous gases are stripped from solution into the gas phase because the liquid is supersaturated with the extraneous gas relative to the gas phase and therefore transfer is out of the liquid into the gas.

Water as it exists in the environment is in contact with air that not only contains oxygen gas but also nitrogen, carbon dioxide, argon and other trace gases. Many micro and macro organisms utilize oxygen in their life processes, so the water may or may not be saturated with oxygen. However, because nitrogen gas and other gases are conservative gases, these other gases are not utilized. Conservative gases are normally always at saturation conditions in the waters of the environment. Consequently, when HPO is dissolved into water, any other gas already dissolved in the water will be stripped from the liquid phase into the gas phase. This results in a dilution of the HPO in the gas phase and lowers the oxygen composition of the gas phase, causing a reduction of $C_{sat}$, and a corresponding reduction in the rate of gas transfer.

Nitrogen gas in air has a partial pressure of 0.79 atmospheres, and, therefore, at equilibrium has a dissolved partial pressure of 0.79 atmospheres. At sea level and 20° C., this saturation concentration of nitrogen gas dissolved in water in equilibrium with air is about 16 mg/L of dissolved nitrogen. Thus, if a bubble of pure oxygen is held in contact with water at saturation level with air, the oxygen composition will reduce from 100% oxygen to ultimately only 21% oxygen (if 100% oxygen absorption efficiency is achieved) by the combined process of oxygen being absorbed from the bubble into the water and nitrogen gas being stripped from solution into the bubble.

If the oxygen absorption efficiency is less than 100%, some of the gas will be wasted from the system, carrying with it some of the oxygen as well as nitrogen stripped from solution. In such a case, the equilibrium oxygen composition of the bubble would be above 21%.

There are advantages to be gained by conducting the gas transfer of the high purity gas into the liquid under elevated pressure. Two major advantages accrue to such a procedure: 1) pressure increases in the gas phase to be dissolved resulting in a concomitant increase in $C_{sat}$, and 2) the stripping potential of the extraneous gases, such as nitrogen, already dissolved in the liquid are reduced.

For instance, if 100% $O_2$ is to be dissolved into water which is at the air saturation with nitrogen at ambient pressure this reduces $C_{sat}$ from 45 mg/L to 9.2 mg/L with a comparable reduction in the rate of oxygen transfer. However, if the pure oxygen bubble is held in contact with water saturated with air at a pressure of 34 ft (2.0 atmospheres absolute) below the surface, the equilibrium composition of nitrogen gas in the bubble now only approaches 39.5% if 100% oxygen absorption was achieved (79%/2 atmospheres). This, of course, is the same partial pressure of nitrogen gas. However, the oxygen composition would now reach an equilibrium value of approximately 60.5% instead of the 21% at ambient pressure. Consequently the corresponding $C_{sat}$ for a pressure of 34 ft would be:

$C_{sat}$=atmospheres (0.605 $O_2$ composition) 45 mg/L per atmosphere of partial pressure=54 mg/L D.O.

If the gas transfer reactor was at 45 psig (4.0 atmospheres absolute) the nitrogen in the gas phase would approach only approach 20% (79%/4). The oxygen composition would then be 80% and the resulting $C_{sat}$ would be:

$C_{sat}$=4 atmospheres (0.80 $O_2$ composition)45 mg/L per atmosphere=144 mg/L

Pressure simultaneously reduces nitrogen gas stripping and increases the $C_{sat}$ of $O_2$. Not only is the rate of gas transfer greatly increased, but also the concentration of D.O. that can be reached in the discharge is also higher.

Even though pressurization can greatly enhance the gas transfer process, it unfortunately also increases the energy consumption required to dissolve the oxygen (in terms of kWatt-hr/ton of D.O.). For instance, it is relatively easy to pressurize a gas transfer chamber by pumping against a backpressure maintained in the chamber with a throttling valve at the discharge. This is the method incorporated in conventional dissolved air floatation processes. Referring now to FIG. 1, there is shown a schematic diagram of an aeration system according to the prior art. Prior art aeration system 10 includes reactor 12, liquid (water) feed inlet 14, feed pump 16 for moving liquid (water) into reactor 12 through feed inlet 14, gas (oxygen) feed inlet 18 for introducing gas (oxygen) into reactor 12, outlet 20, and throttling valve 22. Throttling value 22 is controlled to maintain the desired pressure within reactor 12. While the embodiment of FIG. 1 greatly enhances gas transfer by increasing the pressure within reactor 12, prior art system 10 also greatly increases unit energy consumption. Considerable energy is consumed by pressurization pump 16 to force liquid (water) into reactor 12. The energy transferred into system 10 by pump 16 is later lost at throttling valve 22 when the pressure in reactor 12 is reduced to ambient pressure. It is therefore desired to employ a method of pressurization that minimizes net energy consumption.

The U-Tube is a prior art apparatus used to hydrostatically pressurize the gas transfer process with minimal input of energy. The water is directed vertically down a shaft underneath a baffle and flows back to the surface. Little energy is required to move the water through the U-Tube, but the hydrostatic pressurization can be considerable. For instance, if a U-Tube is 175 ft deep, the hydrostatic pressure at the bottom reaches 6 atmospheres absolute pressure (175/34+ 1=6). If HPO is injected at the inlet of the U-Tube and is swept down and back up out, the $C_{sat}$ can reach 230 mg/L at the bottom (87% $O_2$ times 6 atmospheres times 45 mg/L-atmospheres partial pressure). Thus, considerable increase in the rate of oxygen transfer can be achieved in a U-Tube oxygen transfer system with little energy consumption expended. However, one disadvantage with use of the U-Tube in that is requires the drilling of a deep shaft that presents a problem particularly if rock is encountered at the site. In such cases, the drilling of the shaft can cost several hundred thousand dollars, and, in many instances, is prohibitively expensive.

It is therefore desired to provide a gas transfer system, namely, a system for dissolving at least one gas into a fluid, that is energy efficient. It is also desired to provide such a system that is comprised of reliable components, and that is reasonable in maintenance and repair costs. It is further desired to provide a system that does not require drilling of a deep shaft as is required with the aforementioned U-Tube configuration.

Laboratory experiments have demonstrated that 80 to 120 mg/L of D.O. can be kept in solution without effervescent loss. Effervescent loss of dissolved gas is related to the level of supersaturation of the dissolved gas, the turbulence in the water, and time for loss to take place. There is a threshold level of supersaturation below which effervescent loss cannot occur. Furthermore, above this threshold level, there is a corresponding level of turbulence and time required to make the effervescence occur.

For instance, in dissolved air flotation, the water is aerated in a pressure vessel at 45 to 75 psig (because effervescence is not significant if the pressure is below about 30 psig). Subsequently, it is released through the throttling valve employed to create the backpressure. At 45 psig (4 atmospheres absolute) the water may be near 400% total saturation. However, it takes the violent turbulence in the throttling to make it effervesce. Without this violent turbulence, it effervesces inefficiently.

If water is oxygenated under pressure with high purity oxygen to produce 40 mg/L D.O. and there is negligible change in the dissolved nitrogen concentration, the total dissolved gas pressure will be 0.79 atmospheres of $N_2$ and (40/9.2×0.21 atmospheres) 0.91 atmospheres of $O_2$, for a total of 1.70 atmospheres of dissolved gas. For a D.O. of 80 mg/L, and again ignoring the minor dissolved nitrogen gas stripping under pressurized conditions, the total dissolved gas pressure would be 0.79+(80/9.2×0.21)=2.6 atmospheres of total dissolved gas. As previously mentioned, in laboratory experiments, effervescence was not observed in oxygenated water containing 80 mg/L D.O. This finding implies that the level of supersaturation must exceed 260% to support effervescence.

It is therefore desired to provide a gas transfer system with energy recovery capabilities that also reduces effervescence loss.

SUMMARY OF THE INVENTION

The present invention comprises a gas transfer system and method, i.e., a system and method for transferring any gas into a liquid. Generally, the system includes a reactor or gas transfer vessel, a liquid inlet feed, a gas inlet feed, an outlet, a feed pump and a regenerative turbine. The liquid inlet feed is connected to the reactor for transferring the liquid to the reactor. The gas inlet feed is also connected to the reactor to transfer the gas to the reactor. The outlet is also connected to the reactor for transference of liquid having gas transferred therein in the reactor from the reactor. The feed pump of the present invention is operatively connected to the liquid inlet feed for pressurizing the liquid in the liquid inlet feed and the liquid containing gas housed in the reactor. The regenerative turbine is connected to the feed pump and to the outlet.

Generally, operation of the feed pump and regenerative turbine of the present invention provides a method that results in pressurization within the reactor to enhance gas transfer, minimizes the net energy consumption of the system when compared to prior art systems, and retains highly supersaturated dissolved gas in solution (in the liquid). In some embodiments, such operation further assists in reduction of effervescence loss. The system is also comprised of reliable components, and is not prohibitively expensive to install, maintain, to repair.

In one embodiment, the feed pump and regenerative turbine share a common shaft, such that operation of either the feed pump or the regenerative turbine results in operation of the other. In another embodiment, each of the feed pump and the regenerative turbine comprise a rotatable shaft. The shafts of the feed pump and the regenerative turbine are connected by a drive mechanism, such as a v-belt or a chain, to result in concurrent operation of both the feed pump and the regenerative turbine as a result of operation of one of the shafts of the feed pump or regenerative turbine.

In a third embodiment, the regenerative turbine is connected to an electric generator. In this manner, energy resulting from operation of the regenerative turbine is transferred to the electric generator. The energy transferred to the electric generator can be used to power a part of the system or an external device requiring power.

In another embodiment, the outlet has a first end connected to the reactor and a second, distal end opposite the first end. The system further includes a liquid column having a desired depth and a bottom. The distal end of the outlet resides proximate the bottom of the liquid column. A rotatable shaft is connected to both the feed pump and the regenerative turbine, and the regenerative turbine blade is located within the outlet proximate the bottom of the liquid column.

In yet another embodiment, the system includes a container having fluid therein. The fluid is the liquid having a low level of dissolved gas therein. The distal end of the outlet houses the regenerative turbine and is submerged in the fluid. These latter two embodiments are particularly useful in reducing effervescence loss.

In two other embodiments, the system further comprises an elevated container for holding the liquid therein, and a bypass means. In one of these embodiments, the pump and turbine comprise a single turbine/pump device capable of pumping liquid into the container via the bypass means and capable of regenerating by moving liquid from the container through the reactor for dissolving gas into the liquid in the reactor. In the other embodiment using an elevated container, the pump means is operable to pump liquid into the elevated container, and the regenerative turbine means is operable to cause flow of the liquid through the bypass means and/or the reactor. Both these embodiments use gravity to pressurize the gas transfer reactor and minimize the energy consumed and have other efficiencies.

In yet two further embodiments, the system comprises a second pump to further pressurize the reactor, which in turn increases the concentration of gas dissolved in the liquid. In these embodiments, the first pump and the regenerative turbine share a common shaft, such that operation of either the first pump or the regenerative turbine results in the operation of the other.

DETAILED DESCRIPTION OF THE INVENTION

Figure 1:
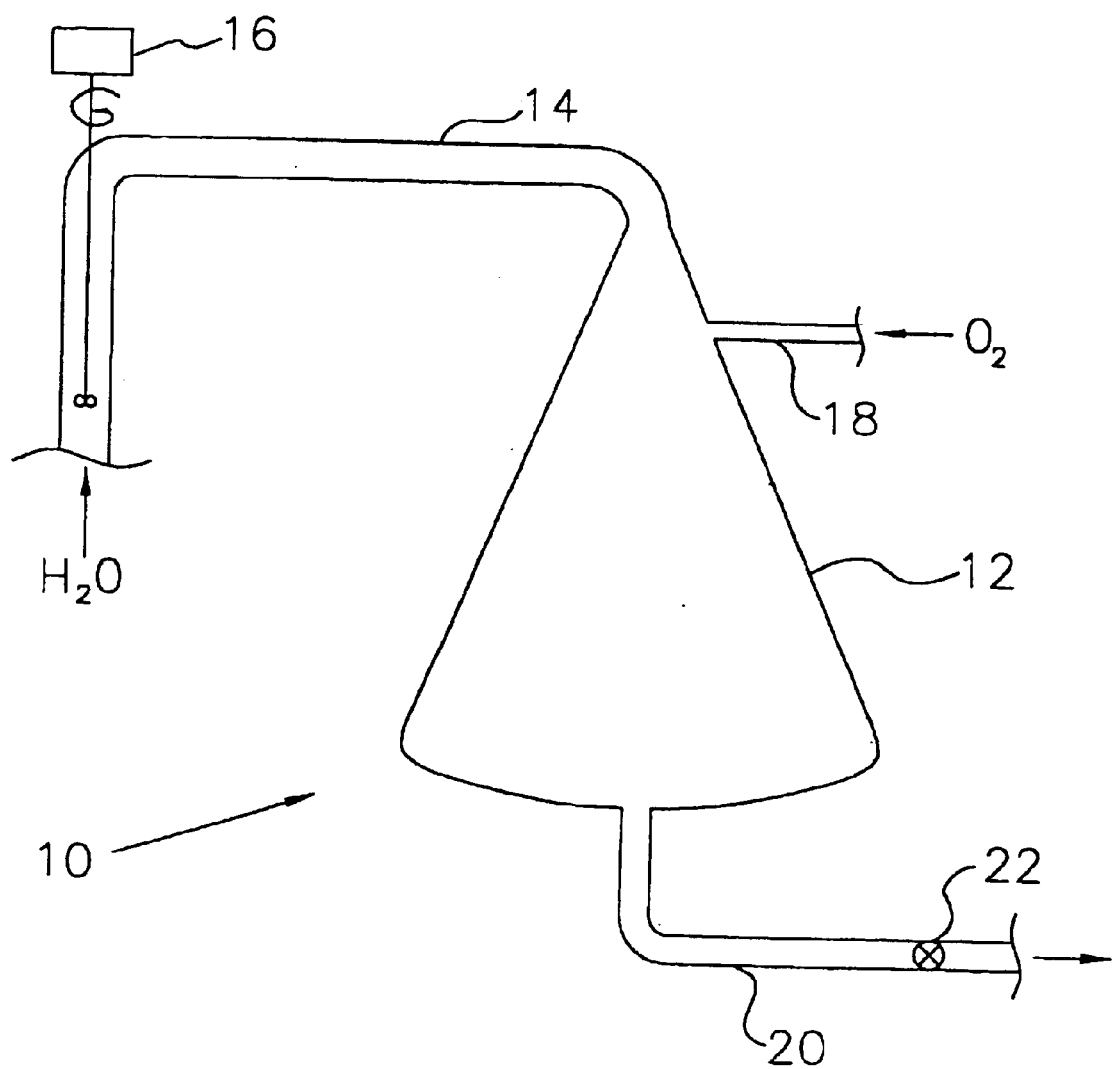
FIG. 1 shows a schematic diagram of one embodiment of an aeration system of the PRIOR ART.

Referring now to FIG. 1, there is shown a schematic view of an aeration system of a prior art system. As previously discussed, in the embodiment of FIG. 1, prior art system 10 includes reactor 12, water (liquid) feed inlet 14, feed pump 16 for moving water (liquid) from feed inlet 14 into reactor 12, 02 (gas) feed inlet 18 for introducing 02 into reactor 12, outlet 20 for transferring liquid (water) having $O_2$ (gas) dissolved therein, and throttle 22 used to maintain pressure in reactor 12.

Figure 2:
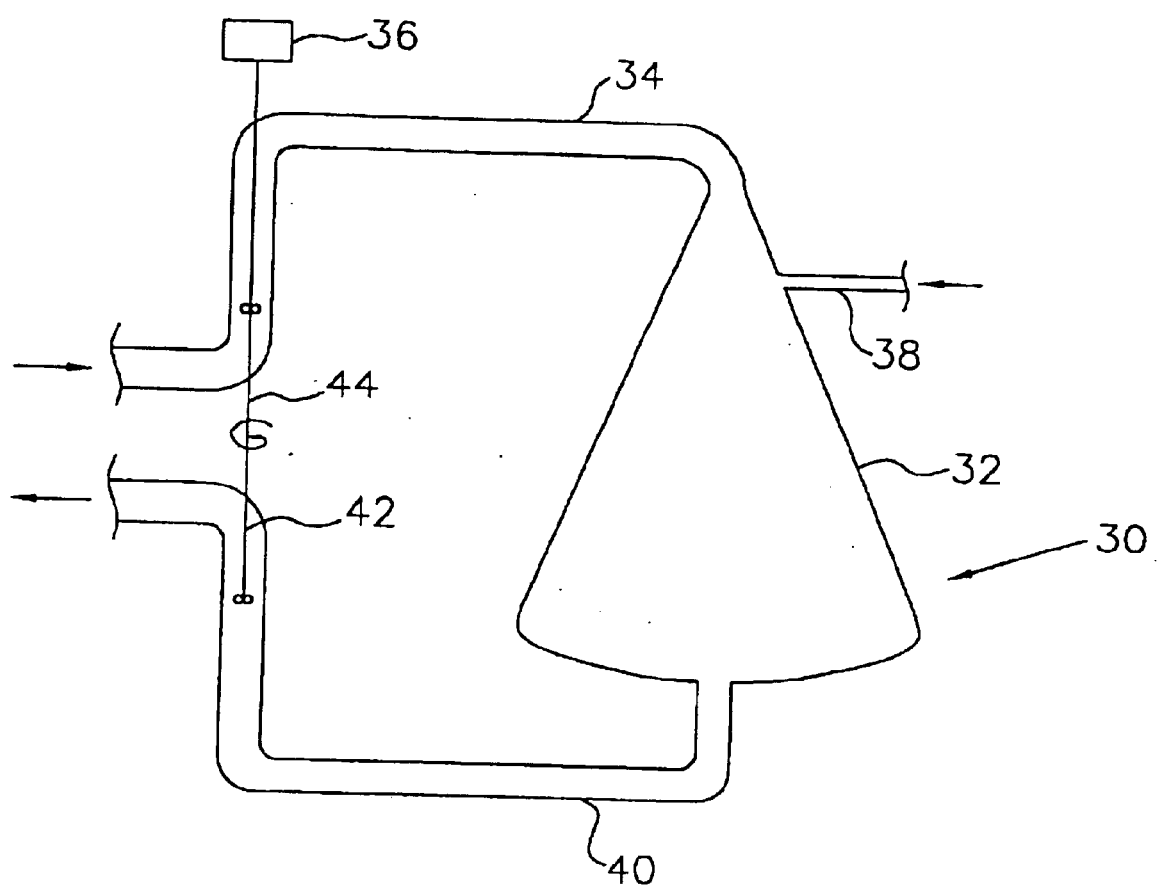
FIG. 2 shows a schematic diagram of one embodiment of a gas transfer system according to the present invention having a regenerative turbine direct coupled to the feed pump of the system.

FIG. 2 shows a schematic view of one embodiment of a gas transfer system according to the present invention having a regenerative turbine directly coupled to the feed pump of the system. Like the embodiment of FIG. 1, system 30 of FIG. 2 includes reactor 32, liquid inlet 34, feed pump 36, $O_2$ (gas) feed inlet 38, and outlet 40. Instead of a throttle at outlet 40, system 30 of FIG. 2 includes regenerative turbine 42 directly coupled to feed pump 36 by shaft 44. Shaft 44 is a common shaft rotated during operation of both feed pump 36 and regenerative turbine 42.

In this embodiment, feed pump 36 may comprise an axial flow, Kaplan, or centrifugal pump, such as manufactured by Flygt or Johson Pump. Similarly, the feed pumps of FIGS. 3, 4, 5, 9, and 10 may also comprise an axial flow, Kaplan, or centrifugal pump, such as manufactured by Flygt or Johson Pump. The regenerative turbines of FIGS. 2, 3, 4, 5, 9, and 10 may comprise an axial flow, a Kaplan turbine, or centrifugal pump, such as manufactured by Cargo-Kraft or Thomson & Howe. Gas inlet 38 may be connected to a pulsed swing absorption oxygen generator or a liquid oxygen vaporizer (not shown) to force the desired gas into reactor 32.

During operation of the embodiment of FIG. 2, feed pump 36 operates to move liquid (water) in liquid inlet 34 into reactor 32. Oxygen is introduced into reactor 32 at gas inlet 38. Feed pump 36 also serves to pressurize reactor 32 for the purpose of enhancing the dissolving of oxygen into the water in reactor 32. Because regenerative turbine 42 is directly coupled to feed pump 36 by common shaft 44, rotation of shaft 44 by regenerative turbine 42 results in operation of commensurately less power being consumed by feed pump 36 to achieve a certain pressure in reactor 32.

Figure 3:
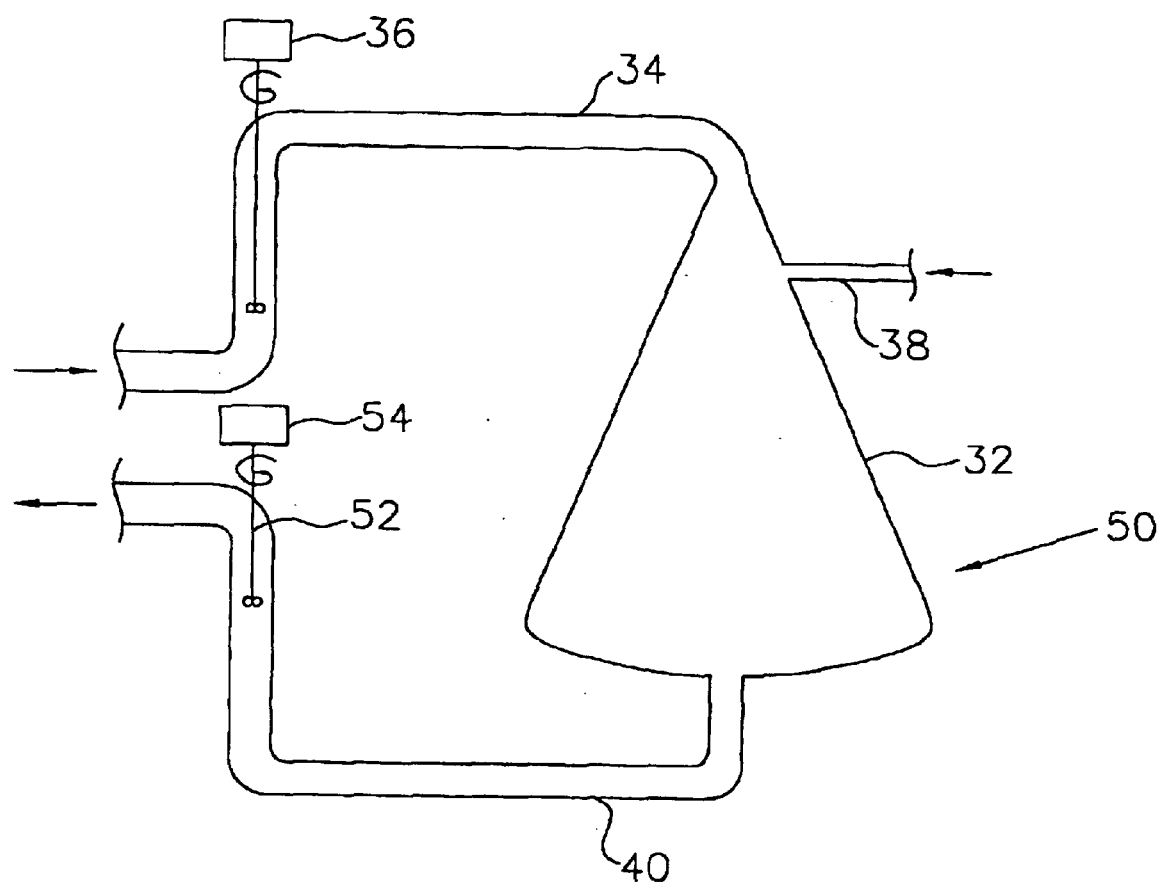
FIG. 3 shows a schematic diagram of a second embodiment of a gas transfer system according to the present-invention having a regenerative turbine driving an electrical generator.

Referring now to FIG. 3, there is shown a schematic view of a second embodiment of a gas transfer system according to the present invention having a regenerative turbine driving an electrical generator. In this embodiment, system 50, like system 30 of FIG. 2, includes reactor 32, liquid inlet 34, feed pump 36, gas inlet 38, and outlet 40. System 50 also includes regenerative turbine 52 is operatively connected to electric generator 54. During operation, the pressurization of reactor 32 by feed pump 36 also results in operation (by pressure) of regenerative turbine 52. The operation of regenerative turbine 52 results in provision of energy (power) to electric generator 54.

Figure 4:
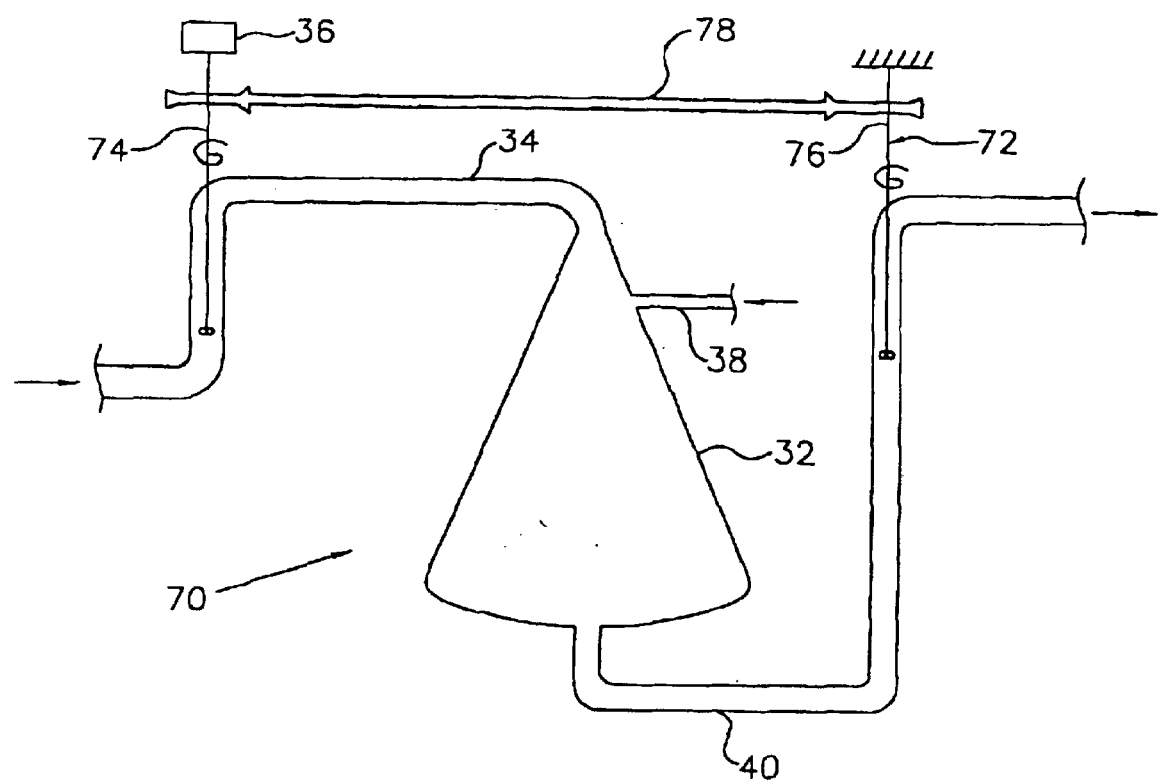
FIG. 4 shows a schematic diagram of a third embodiment of a gas transfer system according to the present invention having a regenerative turbine operatively connected by its shaft to the shaft of the feed pump of the system.

FIG. 4 shows a schematic diagram of a third embodiment of a gas transfer system according to the present invention having a regenerative turbine operatively connected by its shaft to the shaft of the feed pump of the system. System 70, like systems 30 and 50 of FIG. 2 and FIG. 3, respectively, includes reactor 32, liquid inlet 34, feed pump 36, gas inlet 38, and outlet 40. System 70 also includes regenerative turbine 72. In this embodiment, feed pump 36 includes shaft 74 which serves as a drive mechanism for feed pump 36. Regenerative turbine 72 includes shaft 76 which serves as a drive mechanism for regenerative turbine 72. Feed pump 36 is coupled with regenerative turbine 72 by v-belt drive 78, operatively connected to shaft 74 of feed pump 36 and to shaft 76 of regenerative turbine 72.

During operation of the embodiment of FIG. 4, operation of feed pump 36 includes rotation of shaft 74. Rotation of shaft 74 includes movement of v-belt drive 78, which in turn includes rotation of shaft 76 of regenerative turbine 72. Thus, the energy derived from regenerative turbine 72 is transmitted to shaft 74 of feed pump 36, and such pressurization is accomplished with less energy than if only the feed pump was used with a throttling valve, such as that shown in FIG. 1.

Since reduction of net energy consumption is key to effective and economical oxygen transfer using high purity oxygen, a reduction in net energy consumption may be accomplished by recovering some of the energy of the pressurized discharge. Turbines can be used to either pump water to a higher pressure or can serve as hydro-generators (regenerative turbines) when water at a higher pressure is passed through them in the opposite direction. This is the mode of operation of pumped storage hydroelectric operations. At low power demand periods, energy is input into the turbines to move the water to higher elevation storage. During peak power demand, the water from the higher elevation storage is released through the same turbines to generate power. Generally turbine pumps are over 80% efficient both in the pumping and generating mode.

For a system dissolving one ton of oxygen per day, requiring a flow of 10 cubic feet/second into a pressure chamber of 15 psig, a D.O. of 40 mg/L can be produced in the discharge. If the pump is 80% efficient, the pump will require 48 HP to operate. At 8% rate of return and 15 year life, the present worth factor is 8.4. The present worth of the life cycle cost of electricity for a 48 HP pump at $0.05/kwhr and a present worth factor of 8.4 would be $132,000. As mentioned above, the life cycle cost of electricity dwarfs the cost of the pump.

If the regenerative turbine is 80% efficient, then 31 HP can be generated by the pressurized discharge. If the regenerative turbine shaft is directly linked to the pump shaft, such as is shown in FIG. 2 and FIG. 4, the required HP of the feed pump would be only 17 (48=31=17) instead of 48 HP. The life cycle present worth of the electricity consumed in dissolving one ton of oxygen per day would then be: 17 HP×24 hr/d×0.75 kWatt/HP×$0.05/kwhr×365 d/yr×8.4 P.W. =$47,000 life cycle present worth for a savings in life cycle costs of $85,000. The cost of the regenerative turbine would be approximately $15,000 which is a small fraction of the savings in life cycle costs for electricity.

Thus, by providing a second generating turbine at a cost of about $15,000, a smaller pump motor is required, i.e. 17 versus 48 HP and a saving of ($132,000–47,000) $85,000 is realized in life cycle costs. The significant point here is that the present worth of electricity saved dwarfs the cost of the additional turbine required to realize this savings. Consequently the use of energy recovery from an oxygen dissolution vessel has the great economic advantage.

The life cycle of oxygen for one ton per day at $100/ton and 8% for 15 years would be $307,000. This relatively large component of the life cycle also illustrates that high oxygen absorption efficiency must also be incorporated into the transfer process. For instance, if only 50% oxygen absorption efficiency was achieved, it would add an additional $307,000 to the life cycle cost of the project. Thus, it also becomes apparent that the life cycle cost of oxygen and electricity far outweigh the capital cost of the oxygen dissolution system.

From the above example, it is apparent that the pump used to pressurize the oxygen transfer vessel must be of high efficiency and likewise the hydro-generator must also be of high efficiency. For example, if the efficiency of the pump was only 50%, then it would require 76 HP to pump the water into the pressure reactor against 15 psig. Furthermore, at 50% efficiency the hydro-generator would only generate 19 HP from the pressurized discharge, making the net energy consumption 57 HP. This is more than a conventional pump working at 80% efficiency (48 HP) and achieving no regenerative power recovery. Thus, the advantage of this concept requires a high efficiency for both the pump and the hydro-generator. If the pumping was done by gear pump having only 10% efficiency coupled to another gear pump having only 10% efficiency receiving the pressurized discharge, there would be no advantage to be gained. With regard to the gas transfer system according to the present invention, it is preferable that the feed pump and/or the regenerative turbine have an efficiency from about 55% or higher.

It is advantageous to operate the pressurized oxygen transfer chamber at the highest possible discharge D.O. concentration that can be effectively retained in solution after passing through the regenerative turbine. The logic for this is that for a given tonnage of oxygen to be dissolved per day, if the sidestream has a higher concentration of D.O., the required flow rate in the sidestream is reduced accordingly without sacrificing unit energy consumption. Thus, the size and capital cost of the oxygen transfer system is reduced accordingly.

With this scheme for energy recovery from a pressurized gas transfer reactor, high pressures are energetically and economically feasible and this translates into the ease and feasibility of dissolving very high concentrations of oxygen into water. Certain precautions must then be taken to insure the efficient retention of such high dissolved oxygen concentrations as the water is discharged from the pressurized gas transfer reactor.

The embodiment of FIG. 3 differs from that of FIG. 2 and FIG. 4 in that the drive mechanisms (drive means) of the pumps are not directly connected to each other. Instead, in system 50, regenerative turbine 52 is connected to electrical generator 54. Operation of regenerative turbine 52 results in generation of energy. The energy transferred from regenerative turbine 52 to generator 54 can be used to power feed pump 36 or to provide power to another device located proximate system 50. Thus, the embodiment of FIG. 3 also results in reduction of net energy consumption by harnessing energy through regenerative turbine 52.

It will be appreciated by those of skill in the art that the embodiments of FIG. 2 and FIG. 4 involve operable connection of feed pump 36 to regenerative turbine 42 or 72, respectively. It will be further appreciated that such operable connection may be achieved by means other than those illustrated in FIG. 2 and FIG. 4. For example, the operable components of feed pumps and regenerative turbines usually comprise rotatable shafts. The rotatable shafts of the feed pump and regenerative turbine of a gas transfer system according to the present invention could also be connected by a chain drive or other mechanism well-known in the art and contemplated to be within the scope of the invention.

With regard to the issue of effervescence as it relates to the embodiments of FIGS. 2, 3, and 4, improvement is sought over prior art systems, such as that illustrated in FIG. 1. As the highly oxygenated water passes through the regenerative turbine 42, 52, and 72, respectively, of FIGS. 2, 3, and 4, respectively, there still is increased turbulence, even though the level of turbulence is orders of magnitude less than that found in a throttling valve with 45 psig pressure drop.

Figure 5:
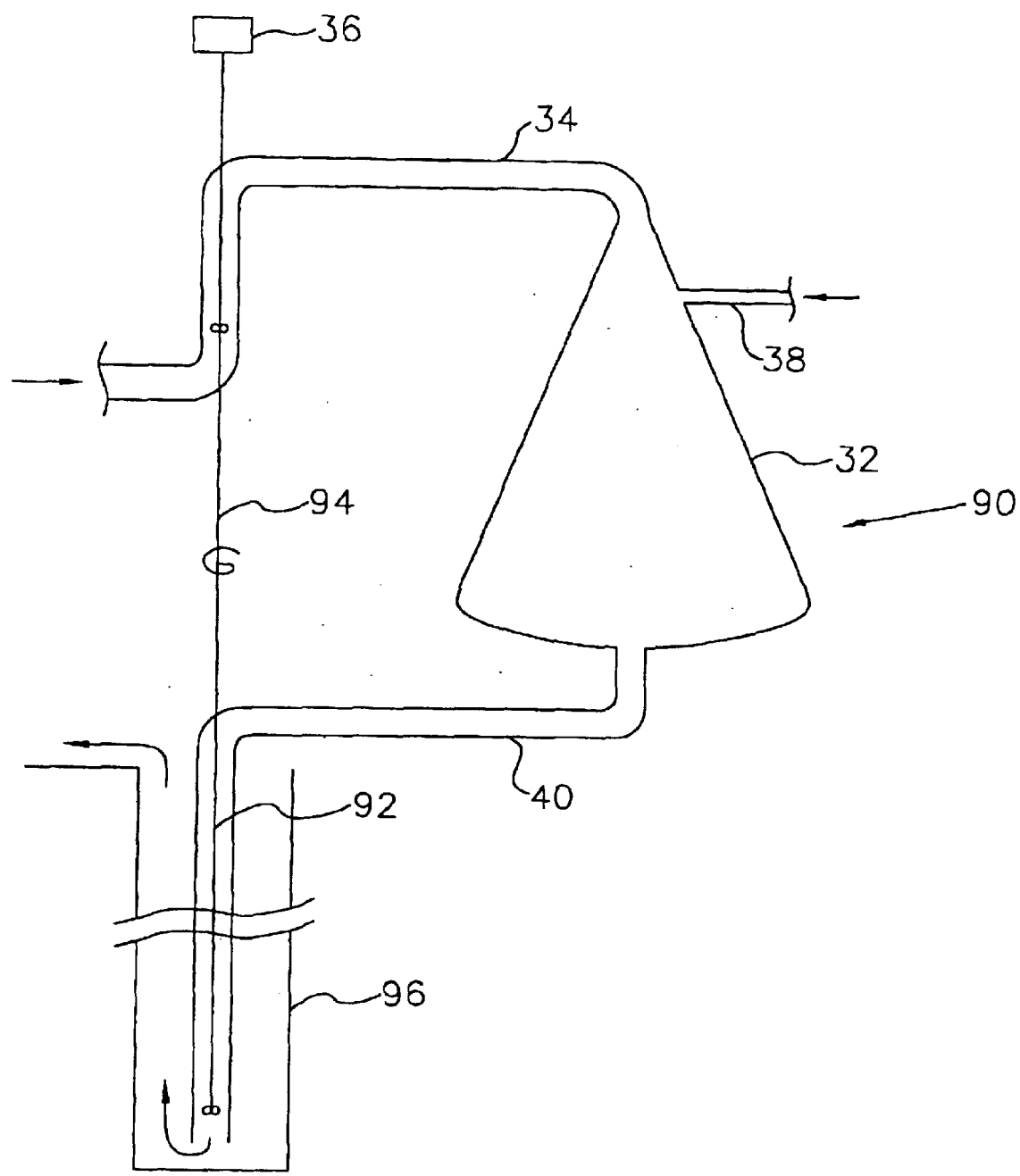
FIG. 5 shows a schematic diagram of a fourth embodiment of a gas transfer system according to the present invention having a regenerative turbine directly coupled with the feed pump of the system with the regenerative turbine positioned at the bottom of a water column.

As is discussed in further detail herein, it is advantageous to place the depressurization zone (regenerative turbine or throttling valve) under increased hydrostatic pressure such as at the bottom of a water column to reduce the relative supersaturation, and thus the potential for effervescence. One such example is shown in FIG. 5. FIG. 5 shows a schematic view of a fourth embodiment of a gas transfer system according to the present invention having a regenerative turbine directly coupled with the feed pump of the system and with the regenerative turbine positioned at the bottom of a water column. System 90 includes reactor 32, liquid inlet 34, feed pump 36, gas inlet 38, and outlet 40. In addition, system 90 includes regenerative turbine 92 is connected by shaft 94 to feed pump 36, and regenerative turbine 92 is placed at the bottom of water column 96. The use of water column 96, as discussed below, operates to prevent effervescence of supersaturated discharge.

The effective supersaturation of water passing through the regenerative turbine is reduced by locating the regenerative turbine at the bottom of a water column. Then this water flows back to the surface under relatively low turbulent conditions as found in pipe flow at 10 ft/sec or less, subsequent effervescence is precluded.

If the pressure drop through the regenerative turbine was in the bottom of a tank that was 20 ft deep, the relative supersaturation would be reduced by 20/34=0.6 atmospheres of pressure. In the case of 40 mg/L of D.O. the level of supersaturation would be reduced from 1.7 atmospheres at the surface to 1.1 atmospheres of supersaturation 20 ft below the surface. In the case of 80 mg/L of D.O., the level of supersaturation would be reduced from 2.6 at the surface to 2.0 at 20 ft below the surface. Thus, increased water depths can be used to retain higher concentrations of D.O. in solution as it passes through the turbulent zone of the regenerative turbine to prevent effervescence. Obviously, water columns of depth greater than 20 feet would be even more effective, and are thus claimed in this patent.

Figure 6:
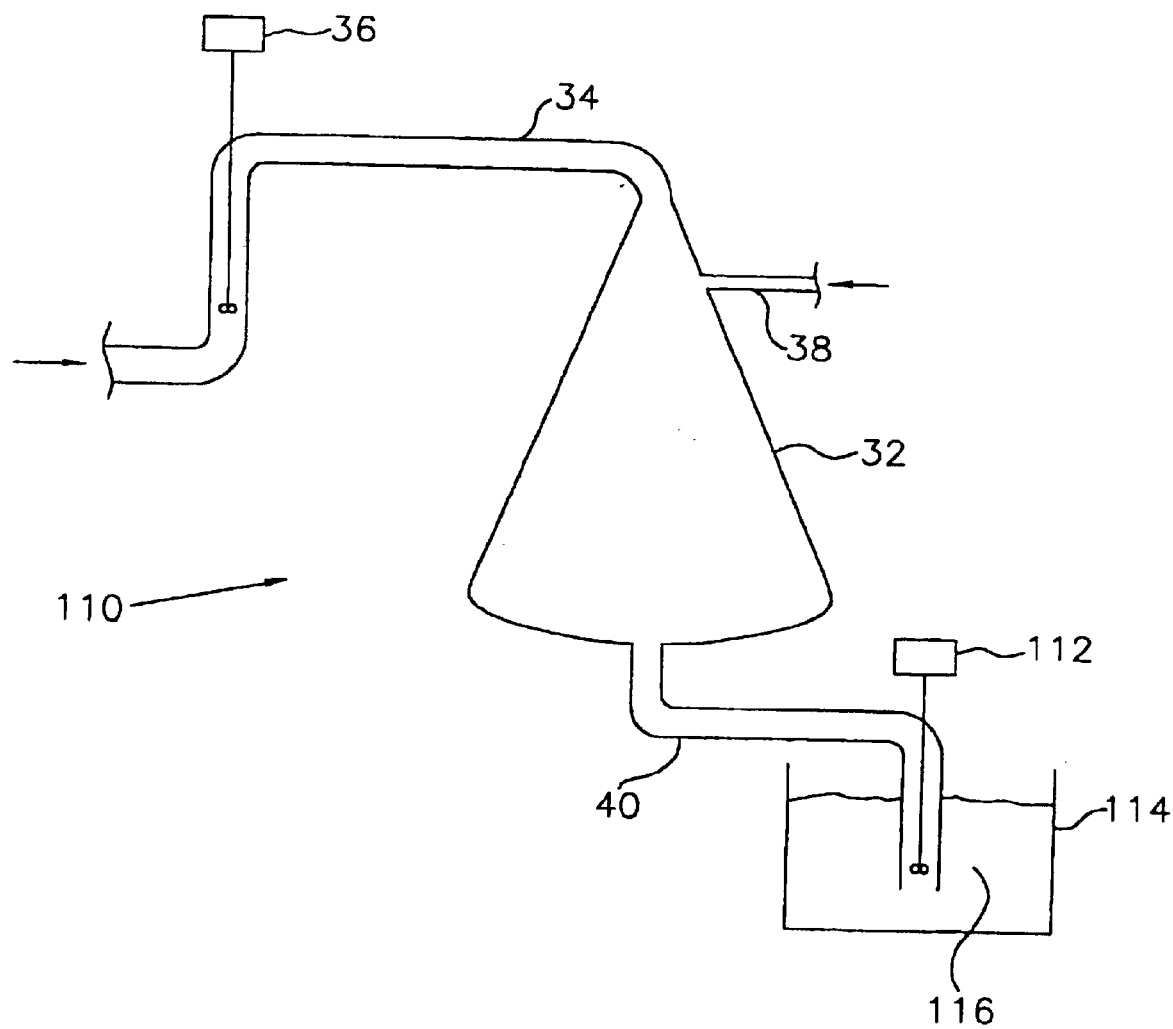
FIG. 6 shows a schematic diagram of a fifth embodiment of a gas transfer system according to the present invention having a regenerative turbine and a low D.O. liquid tank.

Referring now to FIG. 6, there is shown a schematic diagram of a fifth embodiment of a gas transfer system according to the present invention. System 110 includes reactor 32, liquid inlet 34, feed pump 36, gas inlet 38, and outlet 40. In addition, system 110 includes regenerative turbine 112 and tank 114 filled with low D.O. (dissolved gas) water (liquid) 116. During operation, the discharge flowing from reactor 32 through outlet 40 passes through regenerative turbine 112 before going into tank 114.

If the highly supersaturated discharge is immediately diluted to a low level of 2 mg/L D.O. after passing through the regenerative turbine, as found in an activated sludge tank, for example, and as illustrated in the embodiment of FIG. 6, the rapid time of dilution can prevent even very high supersaturated D.O. water from being lost from the dissolved state and effervescing out of solution. This is because time is still required for the effervescent phenomena to occur. In such cases it would be possible to achieve D.O. conditions in excess of 100 mg/L and effectively preclude effervescent loss because of the short dilution time.

The degree of effervescence of supersaturated water is related to time and turbulence as stated above. The turbulence regime as pressurized water is released through a throttling valve is exceptionally high and therefore results in effervescent loss at a lower level of saturation than would be the case where the pressure drop occurs as the supersaturated water discharges through a turbine for recovery of the energy. This is a major advantage of using regenerative turbine energy recovery in that higher levels of dissolved oxygen can be kept in solution after the water leaves the oxygen transfer vessel.

Figure 7:
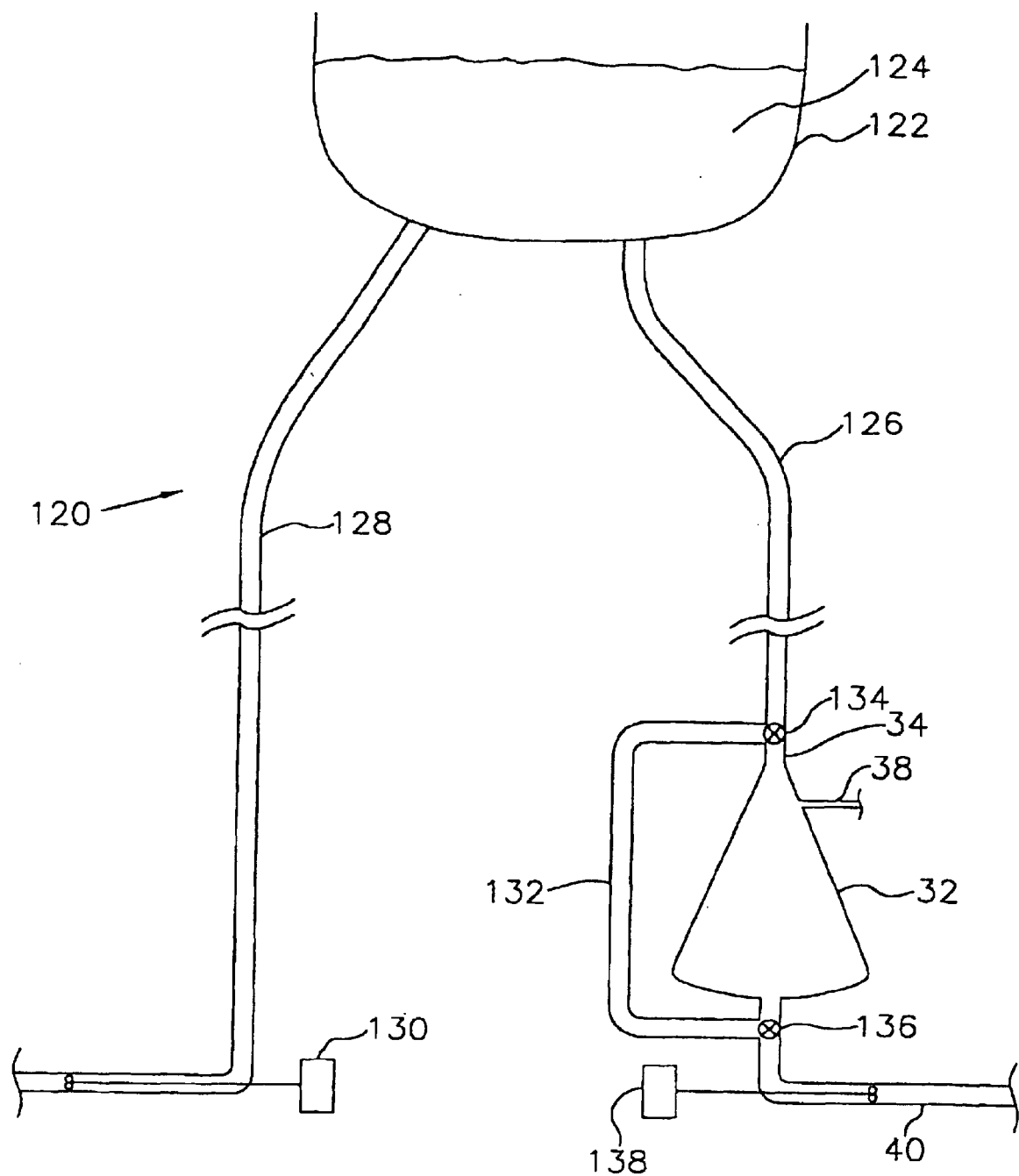
FIG. 7 shows a schematic diagram of a sixth embodiment of a gas transfer system according to the present invention including an elevated container to and from which liquid is continuously pumped.

Referring now to FIG. 7, there is shown a schematic diagram of a sixth embodiment of a gas transfer system according to the present invention including an elevated container to and from which liquid is continuously pumped. System 120 includes reactor 32, liquid inlet 34, gas feed inlet 38, and outlet 40, as included in the embodiments of FIGS. 2, 3, 4, 5, and 6: As shown, these elements are positioned below elevated container 122 having liquid 124 therein. Connecting elevated container 122 to liquid inlet 34 is container outlet 126. Container feed inlet 128 through which liquid 124 may enter elevated tank 122 is also connected to container 122. Liquid feed pump 130 positioned within container feed inlet 128 is used to pump fluid 124 upward into container 122. System 120 further includes bypass tubing 132, first valve 134, second valve 136, and regenerative turbine 138.

First and second valves 134 and 136, respectively, are each incrementally movable between a first position and a second position. When first valve 134 is in the first position, liquid 124 flowing through container outlet 126 flows into liquid inlet 34. When first valve 134 is in the second position, liquid flowing through container outlet 126 flows into bypass tubing 132. When first valve 134 is positioned between its first and second positions, liquid 124 flowing through container outlet 126 flows into both liquid inlet 34 and bypass tubing 132 in relative amounts based on the position of first valve 134.

When second valve 136 is in its first position, the liquid and gas from reactor 32 flows from reactor 32 into outlet 40. When second valve 136 is in its second position, liquid 124 flowing through bypass tubing 132 flows into outlet 40. When second valve 136 is positioned between its first and second positions, both liquid and gas from reactor 32 and liquid 124 from bypass tubing 132 flows into outlet 40 in relative amounts based on the position of second valve 136.

During operation, feed pump 130 operates to continuously pump liquid 124 into elevated container 122 through container inlet 128. Liquid 124 in container 122 continuously flows through container outlets 126 to first valve 134. First and second valves 134 and 136, respectively, are each controlled to be in positions to: (a) cause all liquid 124 to flow from container outlet 126 through reactor 32 into outlet 40 by having both first and second valves 134 and 136 be in their first positions; (b) bypass reactor 32 by causing liquid 124 to flow from container outlet 126 through bypass tubing 132 into outlet 40 by having both first and second valves 134 and 136 be in their second positions; or (c) allow flow from container outlet 126 through both reactor 32 and bypass tubing 132 by having first and second valves 134 and 136 positioned between their respective first and second positions. Generally, the relative positions of both first valve 134 and second valve 136 would, in the latter case, be such that the relative flows of liquid 124 entering reactor 32 and bypass tubing 132 are the same as the relative flows of liquid 124 or liquid and gas entering outlet 40 from reactor 32 and bypass tubing 132, respectively.

Regenerative turbine 138 is operated to maintain pressure in outlet 40, and, hence, pressure in reactor 32 and/or bypass tubing 132, depending, of course, on the positions of first and second valves 134 and 136. System 120 is more energy efficient than prior art systems, such as that illustrated in FIG. 1, due to the use of elevated container 122. Such elevation results in gravity assisting in pressurizing the contents of reactor 32 to enhance the process of dissolving the gas introduced by gas inlet 38 into reactor 32 into the liquid contained in reactor 32.

It will be appreciated by those of skill in the art that feed pump 130 and regenerative turbine 138 could be cooperatively operated in a manner as previously described to further enhance the energy efficiency of system 120. For example, feed pump 130 and regenerative turbine 138 could be connected by a common shaft, such as is illustrated in the embodiment of FIG. 2. Regenerative turbine 138 could be connected to an electric generator, as shown in FIG. 3. The shafts of feed pump 130 and regenerative turbine 138 could be connected by a common drive mechanism in such as is illustrated in the embodiment of FIG. 4, for example.

It will be further appreciated that the embodiment of FIG. 7 could be combined with the embodiments of either FIG. 5 or FIG. 6 to prevent effervescence loss. Specifically, outlet 40 and regenerative pump 138 of FIG. 7 could be placed in a water column, or terminate in a tank having liquid 124 with low dissolved gas therein. Likewise, the embodiments of FIGS. 2, 3, and 4 could also be combined with the water column of FIG. 5 or the tank of FIG. 6 to prevent effervescence loss.

Figure 8:
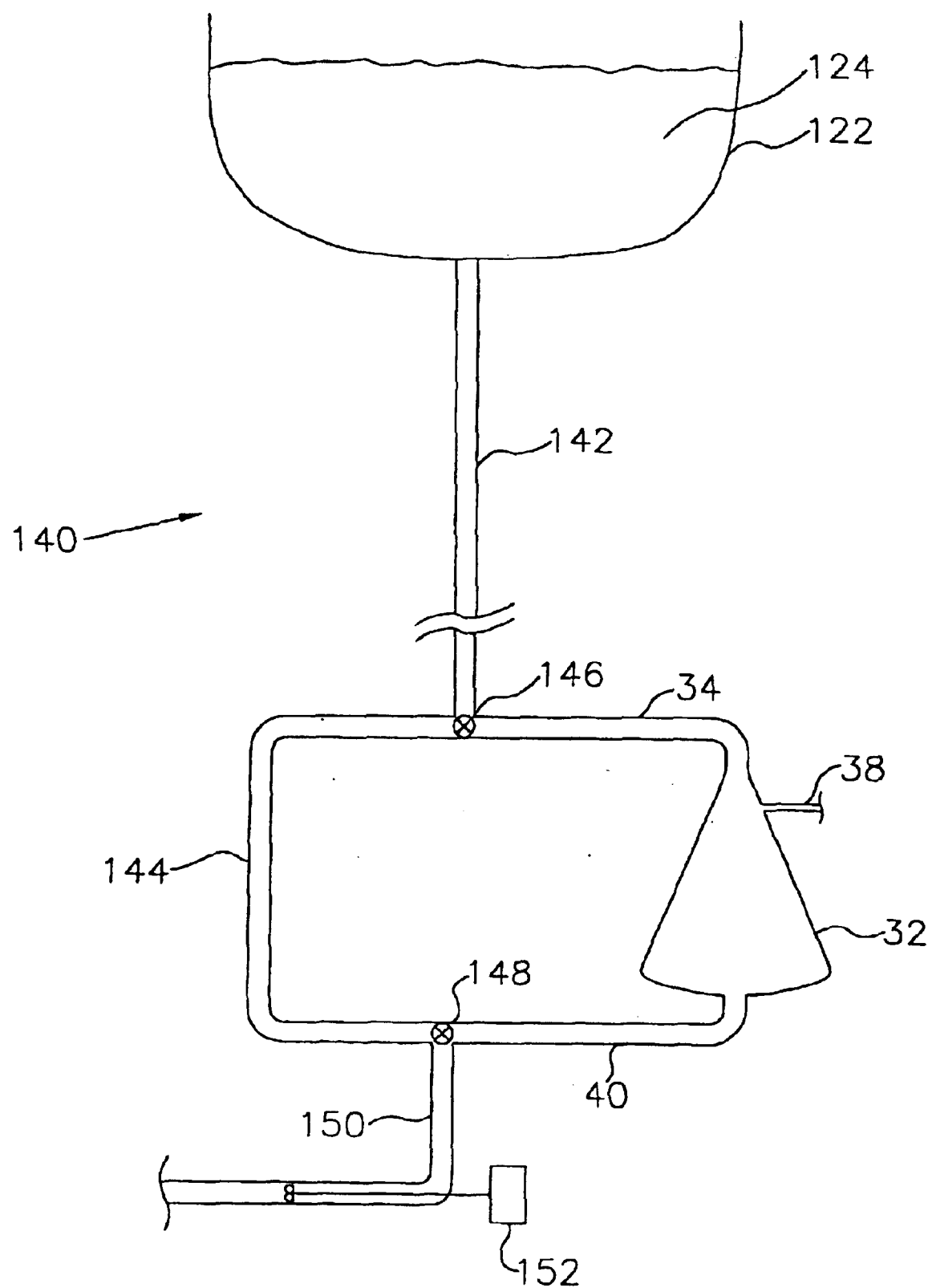
FIG. 8 shows a schematic diagram of a seventh embodiment of a gas transfer system according to the present invention including an elevated container to and from which liquid is alternately pumped.

Referring now to FIG. 8, there is shown a seventh embodiment of a gas transfer system according to the present invention including an elevated container to and from which liquid is alternately pumped. System 140 includes reactor 32, liquid feed inlet 34, gas feed inlet 38, and outlet 40. Like the embodiment of FIG. 7, the embodiment of FIG. 8 also includes elevated container 122 having liquid 124 therein. System 140 also includes container feed 142, bypass tubing 144, first valve 146, second valve 148, system outlet 150, and turbine pump 152.

First and second valves 146 and 148 of system 140 are each operable between a first position and a second position. When first valve 146 and second valve 148 are in their first positions, flow is permitted in the circuit comprising container feed 142, bypass tubing 144 and system outlet 150. When first and second valves 146 and 148 are in their second systems, fluid flow is permitted in the circuit comprising container feed 142, liquid feed inlet 34, reactor 32, outlet 40, and system outlet 150.

System 140 is operable in two modes. The first mode of operation results in transport of liquid 124 into elevated container 122. The second mode of operation results in transport of liquid 124 through reactor 32 to dissolve the gas introduced by gas inlet 38 therein, i.e., results in gas transfer. To move liquid 124 into container 122, turbine pump 152 is operated as a pump, and first and second valves 146 and 148 are placed in their first positions. Thus, operation of turbine pump 152 as a pump causes liquid to flow through system outlet 150 into bypass tubing 144, into container feed 142, and into container 122.

To use system 140 in gas transfer mode, turbine pump 152 is operated as a turbine and first and second valves 146 and 148 are placed in their second positions. The operation of turbine pump 152 in this manner causes liquid 124 to flow from container 122 into container feed 142, through liquid feed inlet 34 into reactor 32, and then through outlet 40 into system outlet 150.

It will be appreciated by those of skill in the art that system 140 is also more energy efficient than prior art systems. System 140 only requires one device, namely turbine pump 152, to maintain pressurization within reactor 32. No throttling valve, for example is required. Also; when compared to the other embodiments of the present invention, there is only need for one device to serve as both the feed pump and the regenerative turbine. Further, gravity assists in pressurizing the contents of reactor 32.

It will also be appreciated that the embodiment of FIG. 8 could be combined with the embodiments of FIG. 5 or 6 to prevent effervescence loss. To do so, bypass tubing 144 may be configured to avoid flow in the water column or low dissolved gas tanks of these embodiments to fill elevated container 122.

Figure 9:
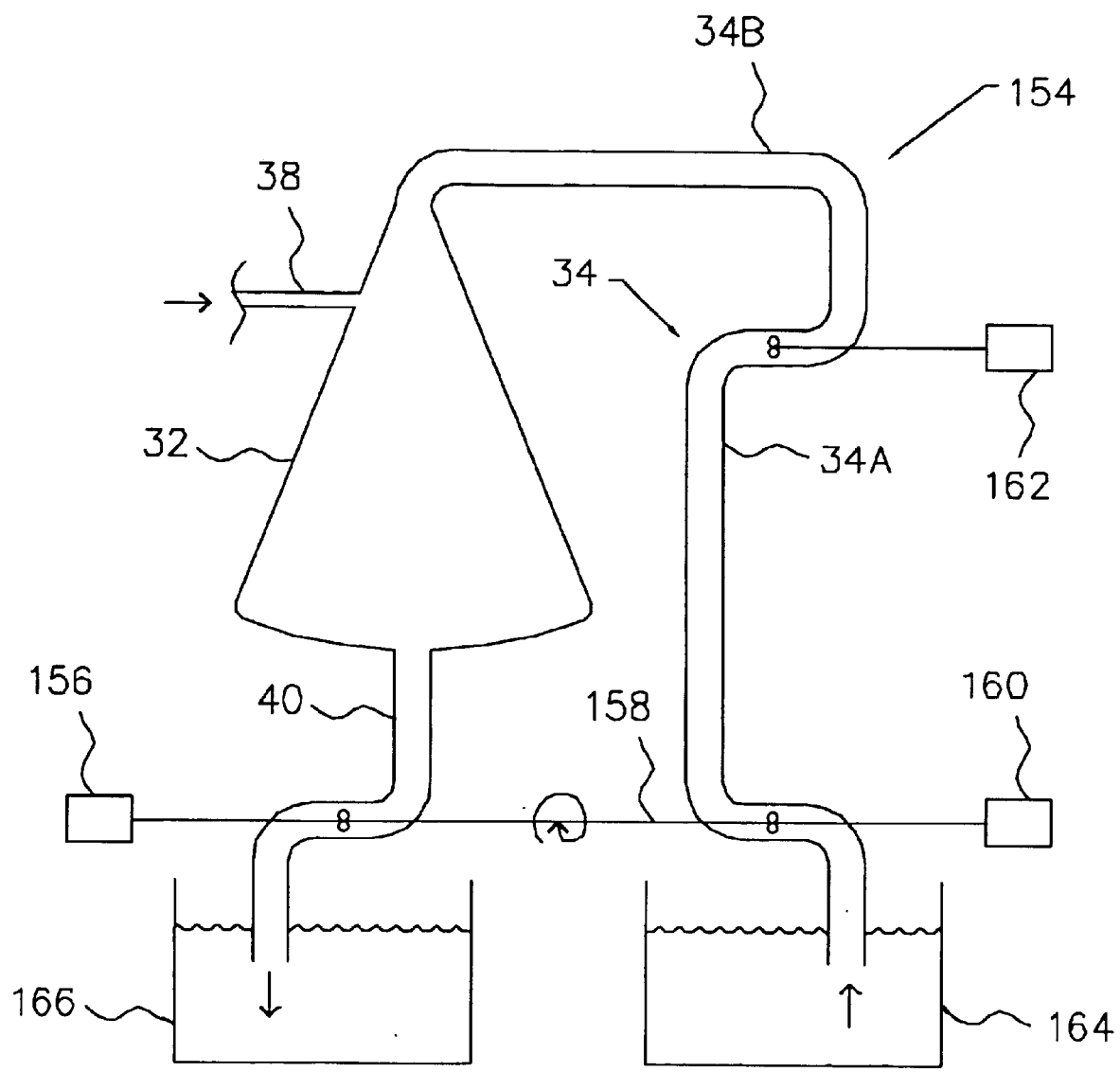
FIG. 9 shows a schematic diagram of an eighth embodiment of a gas transfer system according to the present invention having a second feed pump to further pressurize the reactor of the system.

Referring now to FIG. 9, there is shown a schematic diagram of an eighth embodiment of a gas transfer system according to the present invention having a second feed pump to further pressurize reactor 32 of system 154 in order to increase the concentration of gas dissolved in the fluid in reactor 32. System 154 includes reactor 32, liquid inlet 34, liquid inlet 34 having a first end 34A and a second end 34B, gas feed inlet 38, and outlet 40. Liquid inlet 34 is comprised of a material impervious to the passage of liquid therethrough. It is also desired that the material of liquid inlet 34 be resistant to corrosion caused by the liquid. If the liquid comprises water, for example, liquid inlet 34 may be comprised of plastic or metal. System 154 also includes a regenerative turbine 156 directly coupled to a first feed pump 160 via a shaft 158. Similar to shaft 44 of the embodiment shown in FIG. 2, shaft 158 is a common shaft rotated during operation of both first feed pump 160 and regenerative turbine 156.

System 154 further includes a second feed pump 162 operably connected to liquid inlet 34 between first end 34A and second end 34B. In one embodiment, second feed pump 162 is operably connected to a motor (not shown) of a type well known in the art, which motor operates second feed pump 162. In addition, system 154 also includes a first reservoir 164 from which first feed pump 160 draws liquid into system 154 and a second reservoir 166 into which the liquid having gas dissolved therein is discharged, as explained in detail below. In one embodiment of FIG. 9 (and FIG. 10, described below), first reservoir 164 and second reservoir 166 are impervious to the passage of liquid therethrough, and may be resistant to corrosion caused by liquids. For example, first reservoir 164 and second reservoir 166 may be comprised of plastic or metal. It will be recognized by one of ordinary skill in the art that in other embodiments of the present invention first reservoir 164 and second reservoir 166 may comprise a natural containers, such as, for example, a lagoon, or a sewage pool. It will be appreciated by one of ordinary skill in the art that in the embodiments shown in FIG. 9 and FIG. 10, first reservoir 164 and second reservoir 166 may comprise a single reservoir.

During operation of the embodiment of FIG. 9, first feed pump 160 operates to move the liquid from first reservoir 164 into first end 34A of liquid inlet 34. In one embodiment of system 154, the liquid comprises water. A gas is introduced into reactor 32 via gas feed inlet 38. In one embodiment of system 154, the gas comprises oxygen. First feed pump 160 also serves to partially pressurize reactor 32 for the purpose of enhancing the dissolving of the gas into the liquid in reactor 32. Second feed pump 162 operates to continue to move the liquid from first end 34A of liquid inlet 34 into reactor 32 via second end 34B of liquid inlet 34. Pressure pump 162 also serves to further pressurize reactor 32 for the purpose of increasing the concentration of gas dissolved in the liquid to levels higher than those that would exist if system 154 included only first feed pump 160, but not second feed pump 162.

The liquid having the gas dissolved therein is discharged from reactor 32 into second reservoir 166 via outlet 40, and regenerative turbine 156 maintains pressure in reactor 32. Because regenerative turbine 156 is directly coupled to first feed pump 160 via common shaft 158, rotation of shaft 158 by regenerative turbine 156 results in the operation of first feed pump 160 with substantially less power to achieve a certain pressure in reactor 32.

Figure 10:
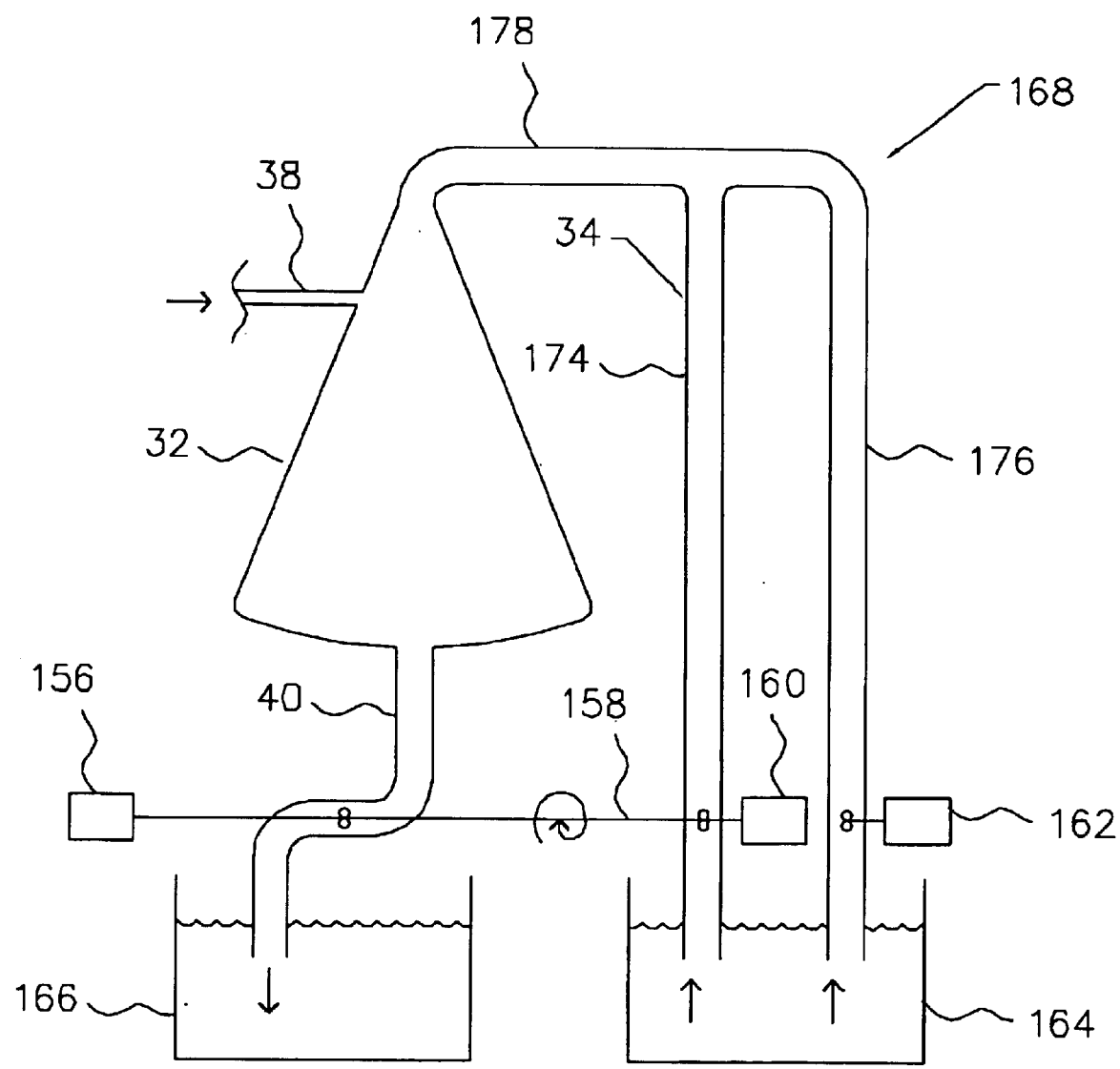
FIG. 10 shows a schematic diagram of a ninth embodiment of a gas transfer system according to the present invention having a second feed pump to further pressurize the reactor of the system.

Referring now to FIG. 10, there is shown a schematic diagram of a ninth embodiment of a gas transfer system also having a second feed pump 162 to further pressurize reactor 32 of system 168 in order to increase the concentration of gas dissolved in the fluid in reactor 32. System 168 includes reactor 32, liquid inlet 34, gas feed inlet 38, and outlet 40. In this embodiment, liquid inlet 34 comprises a first inlet tube 174 and a second inlet tube 176 connected by a header 178. First inlet tube 174 is operably connected to first feed pump 160 and second inlet tube 176 is operably connected to second feed pump 162. System 168 includes a regenerative turbine 156 directly coupled to first feed pump 160 via shaft 158. As stated above, shaft 158 is a common shaft rotated during operation of both first feed pump 160 and regenerative turbine 156. In addition, similar to the embodiment of FIG. 9, system 168 also includes a first reservoir 164 and a second reservoir 166.

During operation of the embodiment of FIG. 10, first feed pump 160 operates to move the liquid from first reservoir 164 into first inlet tube 174. In one embodiment of system 168, the liquid comprises water. A gas is introduced into reactor 32 via gas inlet 38. In one embodiment of system 168, the gas comprises oxygen. First feed pump 160 also serves to partially pressurize reactor 32 for the purpose of enhancing the dissolving of the gas into the liquid in reactor 32. Similarly, second feed pump 162 operates to move liquid into second inlet tube 176. Second feed pump 162 also serves to increase the pressurization inside reactor 32 for the purpose of increasing the concentration of dissolved gas in the liquid to levels higher than those that would exist if system 168 included only first feed pump 160, but not second feed pump 162. The liquid is pumped upward through first inlet tube 174 and second inlet tube 176 into header 178. Header 178 supplies reactor 32 with the liquid.

The liquid having the gas dissolved therein is discharged from reactor 32 into second reservoir 166 via outlet 40, and regenerative turbine 156 maintains pressure in reactor 32. Because regenerative turbine 156 is directly coupled to first feed pump 160 via common shaft 158, similar to the embodiment of FIG. 9, rotation of shaft 158 by regenerative turbine 156 results in the operation of first feed pump 160 with substantially less power to achieve a certain pressure in reactor 32.

In one embodiment of FIGS. 9 and 10, second reservoir 166 is filled with a low dissolved gas liquid, such as, for example, low D.O. water. As the pressure inside reactor 32 is further increased due to second feed pump 162, even more of the gas is dissolved into the liquid (i.e., the discharge from reactor 32 may be supersaturated). If the discharge is supersaturated with a gas, some of the gas may spontaneously effervesce. Such effervescence can be minimized, if not eliminated, if the discharge is released into some bulk volume of liquid, such as that contained in second reservoir 166 that contains low concentrations of dissolved gas.

It will be appreciated by those of skill in the art that the feed pumps, regenerative turbines, turbine pumps, and valves of the present invention may all be connected to an electronic controller (not shown) by means well known in the art. In this manner, the operation of the gas transfer system may be automatically controlled, either with or without human intervention.

The present invention proposes various schemes for recovering the energy and preventing effervescence from the liquid (water having oxygen dissolved therein) exiting the pressurized oxygen transfer reactor. In the proposed system for pressurizing an oxygen transfer reactor according to the present invention, the same turbine pump and motor installed on the inlet can be installed on the discharge with the power generated fed to the inlet pump motor to reduce net electricity consumption. Power recovery can be achieved by having a common shaft that connects the inlet pump with the discharge turbine as shown in FIG. 2, FIG. 9, and FIG. 10. As shown in FIG. 3, the regenerative turbine can drive an electric generator. The discharge regenerative turbine shaft can be connected by V-belt pulley to a similar pulley on the pump shaft transferring discharge power directly to the pump shaft as shown in FIG. 4. As shown in FIG. 5, the regenerative turbine can be located at the bottom of a water column and share a common shaft with the pump, utilizing the hydrostatic pressure of the column to reduce the effervescence potential of the supersaturated water without adding to the energy consumption of the process. The regeneration turbine discharge can be placed in a tank for immediate dilution of supersaturated D.O. from the gas transfer vessel as shown in FIG. 6. FIGS. 7 and 8 utilize an elevated container for continuous or batch operation, respectively, for energy recovery. FIGS. 9 and 10 utilize a second pump to further increase the pressure of the liquid and the concentration of dissolved gas in the liquid. All these embodiments exhibit the advantages of: (a) the use of pressurization to enhance gas transfer, (b) minimizing net energy consumption; and (c) retention of highly supersaturated D.O. in solution. The embodiments of FIG. 5 and FIG. 6 further help to reduce effervescence loss.

It will be appreciated by those of skill in the art that the system of the present invention, while described to be used for dissolving oxygen into water, may be used for any system requiring that a gas be dissolved into a fluid. Other fluid/gas combinations may include, for example, water/ozone, coal liquifaction, hydrogenation of oils, and the like. The <present invention is not to be limited by the aforementioned oxygen and water combination.

It will be further appreciated, that the gas transfer system according to the present invention may be applicable to a myriad of applications. For example, the gas transfer system may be used for maintenance of the macro and microbial organisms in rivers, lakes, oceans, and the like, as well as in ponds for fish or shellfish. The system may also be used for aerobic wastewater treatment processes to maintain sufficient levels of oxygen to avoid undesirable odors. Another application is treatment of wastewater from industries, such as pharmaceutical, petroleum, and chemical, for example, to efficiently dissolve oxygen with negligible off gas stripping which strips the organics and solvents from the aqueous phase and does not allow sufficient time for the organics and solvents to biodegrade in the liquid. Aerobic activated sludge treatment is another example of a use of the system of the present invention.

It will be still further appreciated that the gas transfer system of the present invention is comprised of reliable components. The maintenance and repair costs are also reasonable.

Further, with the embodiment of FIG. 5, no drilling of a deep shaft is required for the system.

I claim:

1. A gas transfer system comprising:
   a reservoir having liquid therein;
   a reactor;
   a liquid inlet connected to the reactor for feeding a liquid from the reservoir into the reactor;
   a gas inlet feed connected to the reactor for feeding a gas into the reactor;
   an outlet connected to the reactor for transferring the liquid having at least some of the gas dissolved therein from the reactor to the reservoir;
   a first feed pump operatively connected to the fluid inlet for pressurizing the liquid inlet feed and the reactor;
   a second feed pump operatively to the fluid inlet for further pressurizing the liquid inlet feed and the reactor;
   a regenerative turbine operatively connected to the outlet; and
   a rotatable shaft, the shaft connecting the first feed pump and the regenerative turbine and serving to operate both the first feed pump and the regenerative turbine.

2. The gas transfer system of claim 1, wherein the first feed pump comprises an axial flow pump.

3. The gas transfer system of claim 1, wherein the first feed pump comprises a centrifugal pump.

4. The gas transfer system of claim 1, wherein the second feed pump comprises an axial flow pump.

5. The gas transfer system of claim 1, wherein the second feed pump comprises a centrifugal pump.

6. The gas transfer system of claim 1, wherein the regenerative turbine comprises a Kaplan turbine.

7. The gas transfer system of claim 1, wherein the regenerative turbine comprises a centrifugal pump.

8. The gas transfer system of claim 1, wherein the reactor comprises an aerator, the liquid comprises water, and the gas comprises oxygen.

9. A method of gas transfer comprising the steps of:
providing a gas transfer system according to claim 1;
feeding the gas into the reactor via the gas inlet feed;
operating the first feed pump and the second feed pump to feed the liquid from the reservoir into the reactor via the liquid inlet;
operating the first feed pump, the second feed pump and the regenerative turbine to pressurize the gas and the liquid housed in the reactor;
dissolving at least some of the gas into liquid in the reactor; and
transferring the liquid having at least some of the gas dissolved therein from the reactor to the reservoir via the outlet.

10. The method of claim 9 wherein the gas comprises oxygen and the liquid comprises water such that the method results in dissolving oxygen into the water.

11. A gas transfer system comprising:
a first reservoir having liquid therein;
a second reservoir,
a reactor;
a liquid inlet connected to the reactor for feeding a liquid from the first reservoir into the reactor;
a gas inlet feed connected to the reactor for feeding a gas into the reactor;
an outlet connected to the reactor for transferring the liquid having at least some of the gas dissolved therein from the reactor to the second reservoir;
a first feed pump operatively connected to the fluid inlet for pressurizing the liquid inlet feed and the reactor;
a second feed pump operatively to the fluid inlet for further pressurizing the liquid inlet feed and the reactor;
a regenerative turbine operatively connected to the outlet; and
a rotatable shaft, the shaft connecting the first feed pump and the regenerative turbine and serving to operate both the first feed pump and the regenerative turbine.

12. The gas transfer system of claim 11, wherein the second reservoir contains a liquid, the liquid having a low level of dissolved gas therein such that the discharge of the liquid having at least some of the gas dissolved therein from the reactor into the second reservoir minimizes the effervescent loss of dissolved gas.

13. The gas transfer system of claim 12, wherein the reactor comprises an aerator, the liquid comprises water, and the gas comprises oxygen such that the method results in dissolving oxygen into the water.

14. The gas transfer device of 12, wherein the fluid inlet comprises a first end and a second end, and wherein the first feed pump is operatively connected to the first end of the fluid inlet and the second feed pump is operatively connected to the second end of the fluid inlet.

15. The gas transfer device of claim 12 wherein the fluid inlet comprises a first inlet tube and a second tube connected by a header, and wherein the first feed pump is operatively connected to the first inlet tube and the second feed pump is operatively connected to the second inlet tube.

16. A method of gas transfer comprising the steps of:
providing a gas transfer system according to claim 11;
feeding the gas into the reactor via the gas inlet feed;
operating the first feed pump and the second feed pump to feed the liquid from the first reservoir into the reactor via the liquid inlet;
operating the first feed pump, second feed pump, and regenerative turbine to pressurize the gas and the liquid housed in the reactor;
dissolving at least some of the gas into the liquid in the reactor;
transferring the liquid having at least some of the gas dissolved therein from the reactor to the second reservoir via the outlet.

17. The method of claim 16 wherein the second reservoir contains a liquid having a low concentration of dissolved gas such that the method results in preventing the effervescent loss of dissolved gas in the liquid having at least some gas dissolved therein transferred into the second reservoir.

18. The method of claim 17 wherein the gas comprises oxygen, the liquid comprises water, and the liquid contained in the second reservoir contains a low concentration of oxygen such that the method results in dissolving oxygen into the water and in preventing the effervescent loss of dissolved oxygen in the water.

* * * * *